(12) United States Patent
Komiya et al.

(10) Patent No.: US 10,141,589 B2
(45) Date of Patent: Nov. 27, 2018

(54) FUEL CELL SYSTEM AND A METHOD FOR CONTROLLING A FUEL CELL SYSTEM

(71) Applicant: TOYOTA JIDOSHA KABUSHIKI KAISHA, Toyota-shi, Aichi-ken (JP)

(72) Inventors: Kenji Komiya, Nagoya (JP); Masaaki Kondo, Owariasahi (JP); Akira Yamashita, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 447 days.

(21) Appl. No.: 14/883,140

(22) Filed: Oct. 14, 2015

(65) Prior Publication Data

US 2016/0133966 A1    May 12, 2016

(30) Foreign Application Priority Data

Nov. 7, 2014 (JP) ................................. 2014-226888

(51) Int. Cl.
| | |
|---|---|
| H01M 8/04 | (2016.01) |
| H01M 8/04223 | (2016.01) |
| H01M 8/0432 | (2016.01) |
| H01M 8/0438 | (2016.01) |
| H01M 8/04225 | (2016.01) |
| H01M 8/04082 | (2016.01) |

(52) U.S. Cl.
CPC ... *H01M 8/04223* (2013.01); *H01M 8/04225* (2016.02); *H01M 8/04373* (2013.01); *H01M 8/04388* (2013.01); *H01M 8/04425* (2013.01); H01M 8/04201 (2013.01); H01M 2250/20 (2013.01); Y02T 90/32 (2013.01)

(58) Field of Classification Search
None
See application file for complete search history.

(56) References Cited

U.S. PATENT DOCUMENTS

| | | | |
|---|---|---|---|
| 7,271,567 B2 | 9/2007 | Dunn et al. | |
| 2012/0189935 A1* | 7/2012 | Kato | H01M 8/04 429/446 |
| 2013/0014855 A1 | 1/2013 | Yahashi et al. | |
| 2013/0145176 A1 | 6/2013 | Yahashi et al. | |
| 2013/0206257 A1 | 8/2013 | Okawachi et al. | |
| 2014/0277880 A1* | 9/2014 | Takaku | B60L 11/1885 701/22 |

FOREIGN PATENT DOCUMENTS

| | | |
|---|---|---|
| DE | 11 2010 005 532 T5 | 2/2013 |
| JP | 2002-89793 | 3/2002 |
| JP | 2014-149065 A | 8/2014 |

* cited by examiner

*Primary Examiner* — Jonathan Crepeau

(74) *Attorney, Agent, or Firm* — Finnegan, Henderson, Farabow, Garrett & Dunner, LLP

(57) ABSTRACT

A fuel cell system comprises a fuel cell, a tank, a 1st pressure sensor that measures a fill-time pressure, a 2nd pressure sensor that measures a supply piping pressure, a temperature sensor that measures an internal temperature of the tank; and a controller that, when the fuel cell starts, derives an estimated pressure value of the supply piping pressure based on a 1st pressure value that shows the fill-time pressure, the internal temperature when the 1st pressure value was measured, and the internal temperature when the supply piping pressure was measured, and that detects as the supply piping pressure the lower value among the estimated pressure value and the 2nd pressure value that shows the measured supply piping pressure.

11 Claims, 3 Drawing Sheets

FUEL CELL SYSTEM AND A METHOD FOR CONTROLLING A FUEL CELL SYSTEM

CROSS-REFERENCE TO RELATED APPLICATIONS

The present application claims priority on the basis of Japanese patent application number 2014-226888 filed on Nov. 7, 2014, with the entirety of that disclosure incorporated into this application by way of reference.

BACKGROUND

Field

The present invention relates to a fuel cell system.

Related Art

Conventionally, in fuel cell systems having a tank that stores fuel gas for supplying a fuel cell, the pressure value in the tank is detected. For instance, in the fuel cell system described in JP2002-089793A, a pressure sensor is disposed in piping that supplies hydrogen gas from a tank to a fuel cell, and the pressure value in the tank is detected using such a pressure sensor. Additionally, in this fuel cell system, the amount of hydrogen remaining in the tank is calculated based on the detected pressure value in the tank and the temperature in the tank. Generally, the amount of hydrogen remaining in the tank is expressed using the filling factor of the hydrogen gas in the tank, the so-called state of charge (SOC).

In the fuel cell system described in JP2002-089793A, the pressure value in the tank is incorrectly detected by the pressure sensor when so-called drift, in which the zero point fluctuates, occurs. In particular, when the zero point fluctuates in the positive direction and the pressure value detected is higher than the actual value, the filling factor of hydrogen gas in the tank is calculated to be higher than the actual value, creating a risk of hydrogen gas deficiency suddenly occurring while the fuel cell is functioning. Additionally, in moving bodies such as fuel cell vehicles that are equipped with fuel cell systems, for configurations in which distance to empty is estimated based on the hydrogen gas filling factor, the distance to empty is overestimated if the filling factor is calculated to be higher than the actual value. Hence, there is a need for technology that prevents the pressure value in the tank from being incorrectly detected to be higher than the actual value. Problems such as these are not limited to fuel cell systems equipped in moving bodies, but are common in a variety of fuel cell systems used as a fixed source of power and the like.

SUMMARY

The purpose of the invention is to solve at least part of the above problem, which may be achieved in the below aspects.

(1) According to one aspect of the present invention, there is provided a fuel cell. The fuel cell system includes: a fuel cell; a tank that stores gas used in the fuel cell; a 1st pressure sensor that measures a fill-time pressure that is pressure during gas filling in a fill piping for filling the tank with the gas; a 2nd pressure sensor that measures a supply piping pressure that is pressure on start of the fuel cell, in a supply piping for supplying the gas from the tank to the fuel cell; a temperature sensor that measures an internal temperature of the tank; and a controller that, when the fuel cell starts, derives an estimated pressure value of the supply piping pressure based on a let pressure value that shows the fill-time pressure, the internal temperature when the 1st pressure value was measured, and the internal temperature when the supply piping pressure was measured, and detects as the supply piping pressure the lower value among the estimated pressure value and the 2nd pressure value that shows the measured supply piping pressure. Because the fuel cell system of this aspect detects as the supply piping pressure the lower value among the estimated pressure value and the 2nd pressure value and accordingly prevents the pressure value in the tank from being incorrectly detected to be higher than the actual value, even in a situation in which the 2nd pressure value is measured as a higher value than the actual value due to malfunction of the 2nd pressure sensor, etc.

(2) In the fuel cell system of the above aspect, when the controller derives the estimated pressure value, the controller uses the 1st pressure value that shows the largest fill-time pressure during the gas filling. Because the fuel cell system of this aspect derives an estimated pressure value using the 1st pressure value, which shows the largest fill-time pressure during the gas filling and accordingly reduces the effect of depressurization within fill piping in comparison to configurations that use a pressure value during the state that follows completion of gas filling. Accordingly, it is possible to suppress declines in the estimation accuracy of estimated pressure values and to more reliably prevent the pressure value in the tank from being incorrectly detected to be higher than the actual value.

(3) In the fuel cell system of the above aspect, when an absolute value of difference between the estimated pressure value and the 2nd pressure value is above a predetermined value, the controller detects the lower value among the estimated pressure value and the 2nd pressure value as the supply piping pressure, and when the absolute value is below the predetermined value, detects the 2nd pressure value as the supply piping pressure. The fuel cell system of this aspect can detect the supply piping pressure while taking into account the respective measurement errors of the 1st pressure sensor, the 2nd pressure sensor, and the temperature sensor.

(4) In the fuel cell system of the above aspect, the controller records a pressure value detected as the supply piping pressure. Because the fuel cell system of this aspect records the detected pressure value, it is possible to analyze the cause of a malfunction in the 1st or 2nd pressure sensor using such a value, and to send a warning message or a warning sound to a user, etc.

(5) The fuel cell system of the above aspect further includes a filling factor specification portion that derives a filling factor of the gas in the tank using the pressure value detected as the supply piping pressure. The fuel cell system of this aspect derives the filling factor based on the detected pressure value and accordingly can prevent the filling factor of the gas in the tank from being incorrectly detected to be higher than the actual value, can prevent the distance to empty from being overestimated when the fuel cell system is equipped in a fuel cell vehicle, and can prevent a decrease in convenience for the user.

This invention may also be realized in various other aspects. For instance, it may be realized in aspects such as a fuel cell vehicle equipped with a fuel cell system, a method for controlling a fuel cell system, or a method for detecting a pressure in a tank.

DESCRIPTION OF EMBODIMENTS

Figure 1:
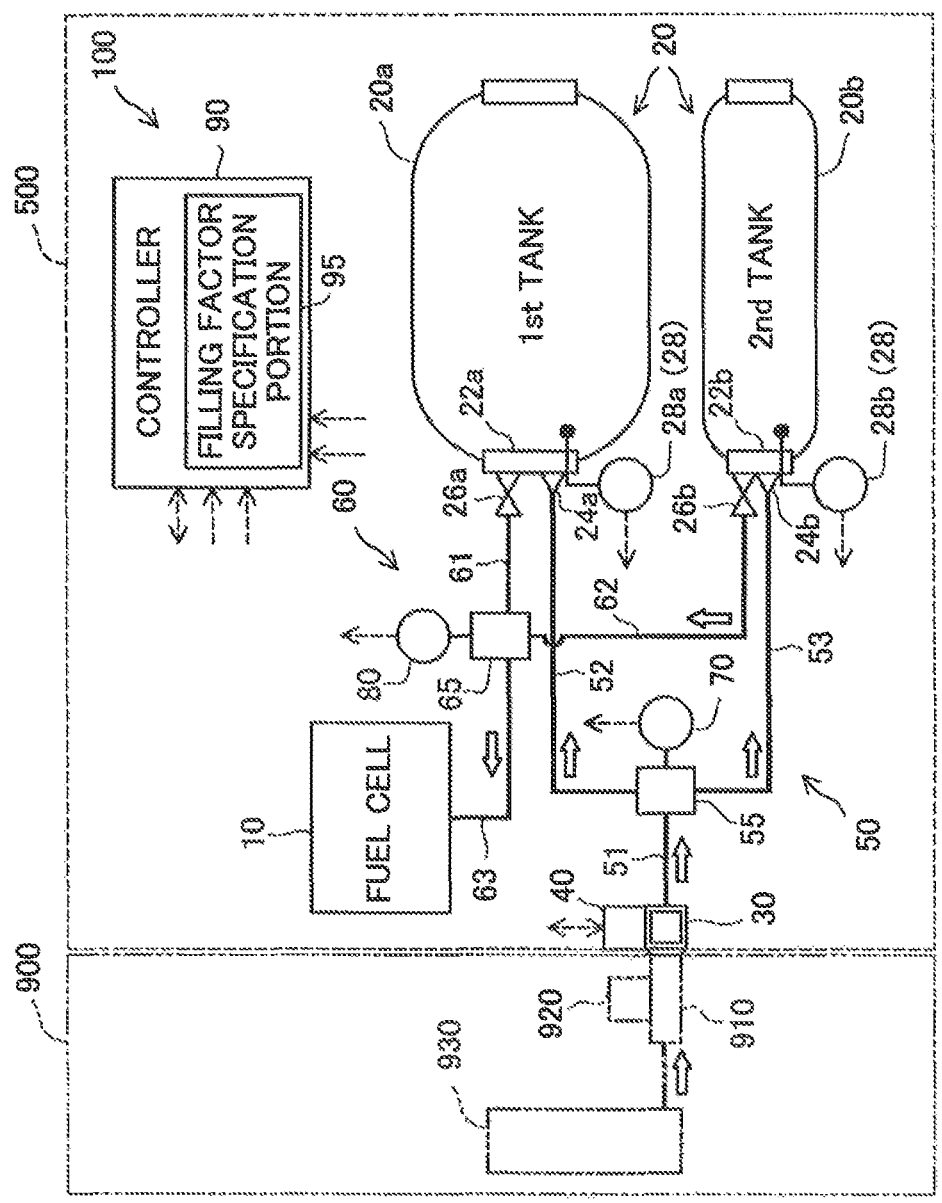
FIG. 1 A diagram showing a schematic of a fuel cell system that is one embodiment of the invention.

A. Embodiment:

A-1. System Configuration:

FIG. 1 is a diagram showing a schematic of a fuel cell system that is one embodiment of the invention. A fuel cell system 100 is equipped and used in a fuel cell vehicle 500 as a system for supplying drive power. For the sake of convenience in the descriptions, in FIG. 1, a hydrogen gas station 900 that supplies hydrogen gas to the fuel cell vehicle 500 is represented by a two-dot chain line, and the direction of hydrogen gas flow is indicated by a white arrow.

The fuel cell system 100 includes a fuel cell 10, a 1st tank 20a, a 2nd tank 20b, a receptacle 30, a communication portion 40, a gas filling system 50, a gas supply system 60, a fill-side pressure sensor 70, a supply-side pressure sensor 80, and a controller 90. The fuel cell 10 is a so-called solid polymer electrolyte fuel cell and has a stacked structure with layers of multiple unit cells that receive a supply of the reaction gases fuel gas and oxidant gas and generate electricity. In the present embodiment, hydrogen gas is used as fuel gas.

The 1st tank 20a and the 2nd tank 20b each internally store hydrogen gas in a compressed state. The 2nd tank 20b differs from the 1st tank 20a in that its volume is smaller than the 1st tank 20a, while in other configurations it is the same as the 1st tank 20a. As such, the specific configuration of the 1st tank 20a is described below, and a description of the specific configuration of the 2nd tank 20b is omitted. The volume of the 1st tank 20a may be equal to or smaller than the volume of the 2nd tank 20b. Additionally, while in the embodiment the fuel cell system 100 includes the two tanks 20a and 20b, however, the fuel cell system 100 may include one or any number of multiple tanks.

The 1st tank 20a is connected to the receptacle 30 by the gas filling system 50. Additionally, the 1st tank 20a is connected to the fuel cell 10 by the gas supply system 60. The let tank 20a has a roughly cylindrical appearance form, and has a structure comprised of reinforcement layers of fiber reinforced plastics (FRP) on the outer peripheral surface of a resin liner. The 1st tank 20a includes a cap 22a at the edge of the roughly cylindrical appearance form. A check valve 24a, a main stop valve 26a, and a 1st temperature sensor 28a are disposed at the cap 22a.

The check valve 24a is connected to the gas filling system 50. The check valve 24a allows in the flow of hydrogen gas supplied via the gas filling system 50 and blocks the flow of hydrogen gas traveling from the 1st tank 20a to the gas filling system 50. The main stop valve 26a is connected to the gas supply system 60. By having the main stop valve 26a open, hydrogen gas stored in the 1st tank 20a is supplied to the fuel cell 10 via the gas supply system 60. The 1st temperature sensor 28a detects a temperature Ta of the inside of the 1st tank 20a and outputs it to the controller 90.

The specifications for the 1st tank 20a are prescribed by law in the following manner: the internal temperature Ta is below 85 degrees Celsius; the hydrogen gas filling factor, the so-called state of charge (SOC), is below 100%; and the internal pressure value is below 87.5 MPa.

Similar to the 1st tank 20a, the 2nd tank 20b includes a cap 22b, a check valve 24b, a main stop valve 26b, and a 2nd temperature sensor 28b. The 2nd temperature sensor 28b detects a temperature Tb of the inside of the 2nd tank 20b. In the descriptions hereinafter, the 1st tank 20a and the 2nd tank 20b are referred to collectively as "tanks 20." Additionally, the 1st temperature sensor 28a and the 2nd temperature sensor 28b are collectively referred to as "temperature sensors 28," while the average value of the temperature Ta and the temperature Tb are referred to as "temperature T."

The receptacle 30 engages with a nozzle 910 of the hydrogen gas station 900 and receives via the nozzle 910 the hydrogen gas supplied from a hydrogen gas supply portion 930. The communication portion 40 is disposed in the vicinity of the receptacle 30 and transmits and receives information to and from a communication portion 920 of the hydrogen gas station 900 using infrared rays. The information transmitted and received may include, for example, the pressure value of inside the tanks 20, etc. As an alternative to infrared communication, the transmission and receiving of information may be carried out using other communication methods as desired.

The gas filling system 50 is disposed between the receptacle 30 and each of the tanks 20a and 20b. The gas filling system 50 includes 1st fill piping 51, 2nd fill piping 52, 3rd fill piping 53, and fill-side branch piping 55. The 1st fill piping 51 is connected to the receptacle 30 at one end and connected to the fill-side branch piping 55 at the other end. The 2st fill piping 52 is connected to the fill-side branch piping 55 at one end and connected to the check valve 24a at the other end. Accordingly, the receptacle 30 and the 1st tank 20a are in communication with each other via the 1st fill piping 51, the fill-side branch piping 55, the 2nd fill piping 52, and the check valve 24a. The 3rd fill piping 53 is connected to the fill-side branch piping 55 at one end and connected to the check valve 24b at the other end. Accordingly, the receptacle 30 and the 2nd tank 20b are in communication with each other via the 1st fill piping 51, the fill-side branch piping 55, the 3rd fill piping 53, and the check valve 24b. The fill-side branch piping 55 distributes hydrogen gas supplied from the 1st fill piping 51 to the 2nd fill piping 52 and the 3rd fill piping 53.

The gas supply system 60 is disposed between each of the tanks 20a and 20b and the fuel cell 10. The gas supply system 60 includes 1st supply piping 61, 2nd supply piping 62, 3rd supply piping 63, and supply-side branch piping 65. The 1st supply piping 61 is connected to the main stop valve 26a at one end and connected to the supply-side branch piping 65 at the other end. The 2nd supply piping 62 is connected to the main stop valve 26b at one end and connected to the supply-side branch piping 65 at the other end. The 3rd supply piping 63 is connected to the supply-side branch piping 65 at one end and connected to the fuel cell 10 at the other end. Accordingly, the 1st tank 20a and the fuel cell 10 are in communication with each other via the main stop valve 26a, the 1st supply piping 61, the supply-side branch piping 65, and the 3rd supply piping 63. The 2nd tank 20b and the fuel cell 10 are in communication with each other via the main stop valve 26b, the 2nd supply piping 62, the supply-side branch piping 65, and the 3rd supply piping 63. The supply-side branch piping 65 combines the hydrogen gases supplied respectively from the 1st supply piping 61 and the 2nd supply piping 62 and supplies them to the fuel cell 10.

The fill-side pressure sensor 70 is disposed in the fill-side branch piping 55 and measures the pressure value inside the gas filling system 50. During the filling of hydrogen gas from the hydrogen gas station 900 to the fuel cell vehicle 500, the pressure value measured by the pressure sensor 70

(hereinafter referred to as "fill-time pressure value Pf") is nearly equivalent to the pressure value inside the tanks 20 during filling. The fill-time pressure value Pf is used in filling control as pressure information from the fuel cell vehicle 500 during filling. Specifically, the controller 90 compares the fill-time pressure value PF and the maximum allowable pressure value of the tanks 20 and, when the fill-time pressure value Pf exceeds 87.5 MPa, which is the maximum allowable pressure value of the tanks 20, the controller 90 transmits a fill stop signal (ABORT signal) to the hydrogen gas station 900. When the hydrogen gas supply portion 930 receives this signal, the hydrogen gas supply portion 930 stops supplying the hydrogen gas.

The supply-side pressure sensor 80 is disposed in the supply-side branch piping 65 and measures the pressure value inside the gas supply system 60. During the supply of hydrogen gas from the tanks 20 to the fuel cell 10, the pressure value measured by the supply-side pressure sensor 80 (hereinafter referred to as "supply-time pressure value Ps") is nearly equivalent to the pressure value inside the tanks 20 during supplying. The supply-time pressure value Ps is used for such purposes as detecting the remaining amount of hydrogen gas in the tanks 20 and detecting leakage of hydrogen gas.

In this embodiment, the fill-side pressure sensor 70 and the supply-side pressure sensor 80 are comprised of a diaphragm-type pressure measuring device. However, as an alternative to a diaphragm-type pressure measuring device, they may be comprised of other arbitrary types of pressure measuring devices as desired.

The controller 90 is a microcomputer that includes a central processing unit (CPU) and a main memory, and is configured as an electrical control unit (ECU). As shown by the dashed arrows in FIG. 1, the controller 90 is electrically connected to the communication portion 40, the temperature sensors 28, and both of the pressure sensors 70 and 80. Along with recording the values outputted from each of the sensors 28 and the sensors 70 and 80, the controller 90 derives the aftermentioned estimated pressure value Pse and detects a current pressure value Psa. Additionally, the controller 90 includes a filling factor specification portion 95. The filling factor specification portion 95 specifies the filling factor of hydrogen gas in the tanks 20 (hereinafter referred to as simply "filling factor").

In this embodiment, the tanks 20 (the 1st tank 20a and the 2nd tank 20b) correspond to the tank in the claims, and the temperature sensors 28 (the 1st temperature sensor 28a and the 2nd temperature sensor 28b) correspond to the temperature sensor in the claims. Additionally, the fill-side pressure sensor 70 corresponds to the 1st pressure sensor in the claims, the supply-side pressure sensor 80 corresponds to the 2nd pressure sensor in the claims, and the temperature T corresponds to the internal temperature in the claims. Further, the gas filling system 50 corresponds to the fill piping in the claims, and the gas supply system 60 corresponds to the supply piping in the claims.

Figure 2:
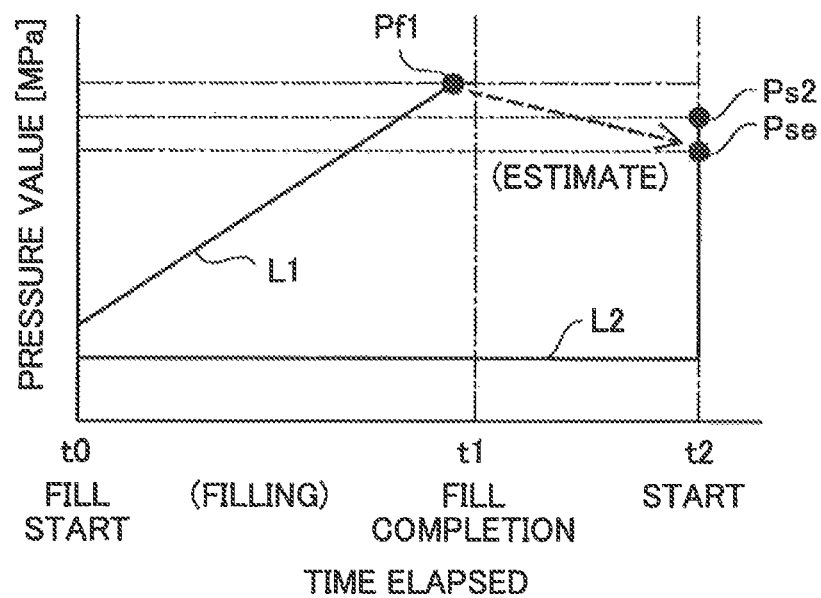
FIG. 2 A diagram showing changes in the pressure value of hydrogen gas in a gas filling system and a gas supply system.

A-2. Changes in the Pressure Value of Hydrogen Gas:

FIG. 2 is a diagram that shows changes in the pressure value of hydrogen gas in the gas filling system 50 and the gas supply system 60. In FIG. 2, the vertical axis shows the hydrogen gas pressure value [MPa], and the horizontal axis shows the time elapsed. Additionally, a pressure line L1 indicated by a solid line shows the fill-time pressure value Pf measured by the fill-side pressure sensor 70, and a pressure line L2 indicated by a solid line shows the pressure value measured by the supply-side pressure sensor 80. A time t0 shows the fill start time of hydrogen gas, a time t1 shows the fill completion time, and a time t2 shows the start time of the fuel cell vehicle 500. The period of time from the time t1 until the time t2 is normally an extremely short amount of time, such as 1 minute. However, when the fuel cell vehicle 500 is left at in the hydrogen gas station 900 for a long period of time due to any circumstances, the period of time from the time t1 until the time t2 corresponds to a comparatively long amount of time, such as 1 week.

Following the fill start time (hereinafter "time t0"), as hydrogen gas is filled from the hydrogen gas station 900 to the fuel cell vehicle 500, the fill-time pressure value Pf rises because the amount of hydrogen gas in the tanks 20 increases. For the fill-time pressure value Pf, a maximum pressure value Pf1 is shown immediately before the filling of hydrogen gas is completed in the time t1, and the maximum pressure value Pf1 is maintained until fill completion. The maximum pressure value Pf1 is nearly equivalent to the pressure value in the tanks 20 at filling completion. The temperature sensors 28 detect a temperature T1 when the maximum pressure value Pf1 is measured, and the controller 90 records such a temperature T1.

Conversely, the pressure value acquired by the supply-side pressure sensor 80 does not change in the period from the time t0 to the time t2. This is because the main stop valves 26a and 26b that both of the tanks 20a and 20b include are closed at the fill start time (the time t0) and opened at the start time of the fuel cell vehicle 500 (the time t2). When both the main stop valves 26a and 26b are opened at the time t2, the pressure value acquired by the supply-side pressure sensor 80 momentarily rises to a measured pressure value Ps2. This measured pressure value Ps2 is nearly equivalent to the pressure value inside the tanks 20 at the supply start time. The temperature sensors 28 detect a temperature T2 when the measured pressure value Ps2 is measured, and the controller 90 records such a temperature T2. In this embodiment it is presumed that, at the time t2, the values of the supply-side pressure sensor 80 and the temperature sensors 28 are both stable.

The filling factor of the hydrogen gas in the tanks 20 is calculated from the pressure value inside the tanks 20 and the temperature T based on the formula shown below.

$$\text{Filling factor [\%]} = \{(Z0 \times T0 \times PA)/(ZA \times TA \times P0)\} \times 100 \qquad (1)$$

In formula (1) above, Z shows the compressibility factor, T the temperature, and P the pressure value, while the index "0" shows that it is the standard value, and the index "A" shows that it is the acquired value of each of the sensors 28, 70, and 80. In this embodiment, Z0=0.99, T0=15 degrees Celsius, and P0=70 MPa are used as the standard values, but other arbitrary values may be used as the standard values. In this embodiment, Z0 and ZA are equivalent.

In formula (1) above, the filling factor at filling completion of hydrogen gas (the time t1) is derived based on the maximum pressure value Pf1 and the temperature T1. Similarly, the filling factor at the start time of the fuel cell vehicle 500 (the time t2) is derived based on the measured pressure value Ps2 and the temperature T2.

Here, in addition to being surveyed by the supply-side pressure sensor 80 as described above, the pressure inside the gas supply system 60 at the time t2 may be estimated using the pressure value measured by the fill-side pressure sensor 70, as shown by the dashed line in FIG. 2. Specifically, under the presumption that the filling factor does not vary during the period from the time of filling completion to the start time of the fuel cell vehicle 500, an estimated pressure value of the inside of the gas supply system 60 at time t2 (hereinafter referred to as "estimated pressure value Pse") is derived using formula (2) shown below based on the maximum pressure value Pf1, the temperature T1, and the temperature T2.

$$\text{Estimated pressure value } Pse \text{ [MPa]}=Pf1\times(T1/T2) \quad (2)$$

However, as shown in FIG. 2, there are situations in which the estimated pressure value Pse and the measured pressure value Ps2 differ. For instance, due to aging degradation, malfunction, and the like of the fill-side pressure sensor 70, a situation in which the zero point of the fill-side pressure sensor 70 fluctuates in the positive direction and the estimated pressure value Pse is detected to be higher than the actual value, or a situation in which the zero point of the fill-side pressure sensor 70 fluctuates in the negative direction and the estimated pressure value Pse is detected to be lower than the actual value, may be imagined. Additionally, due to aging degradation, malfunction, and the like of the supply-side pressure sensor 80, a situation in which the zero point of the supply-side pressure sensor 80 fluctuates in the positive direction and the measured pressure value Ps2 is detected to be higher than the actual value, or a situation in which the zero point of the supply-side pressure sensor 80 fluctuates in the negative direction and the measured pressure value Ps2 is detected to be lower than the actual value, may be imagined. In particular, when the zero point of the supply-side pressure sensor 80 fluctuates in the positive direction and the measured pressure value Ps2 is detected to be higher than the actual value, for the configuration in which the amount of hydrogen gas remaining in the tanks 20 is specified using the supply-time pressure value Ps measured by the supply-side pressure sensor 80, there is a risk that the pressure value inside the tanks 20 will be incorrectly detected to be higher than the actual value and the filling factor will be calculated to be higher than the actual value. On that point, this embodiment of the fuel cell system 100 prevents the pressure value inside the tanks 20 from being incorrectly detected to be higher than the actual value by carrying out current pressure value detection processing, which will be described below.

Figure 3:
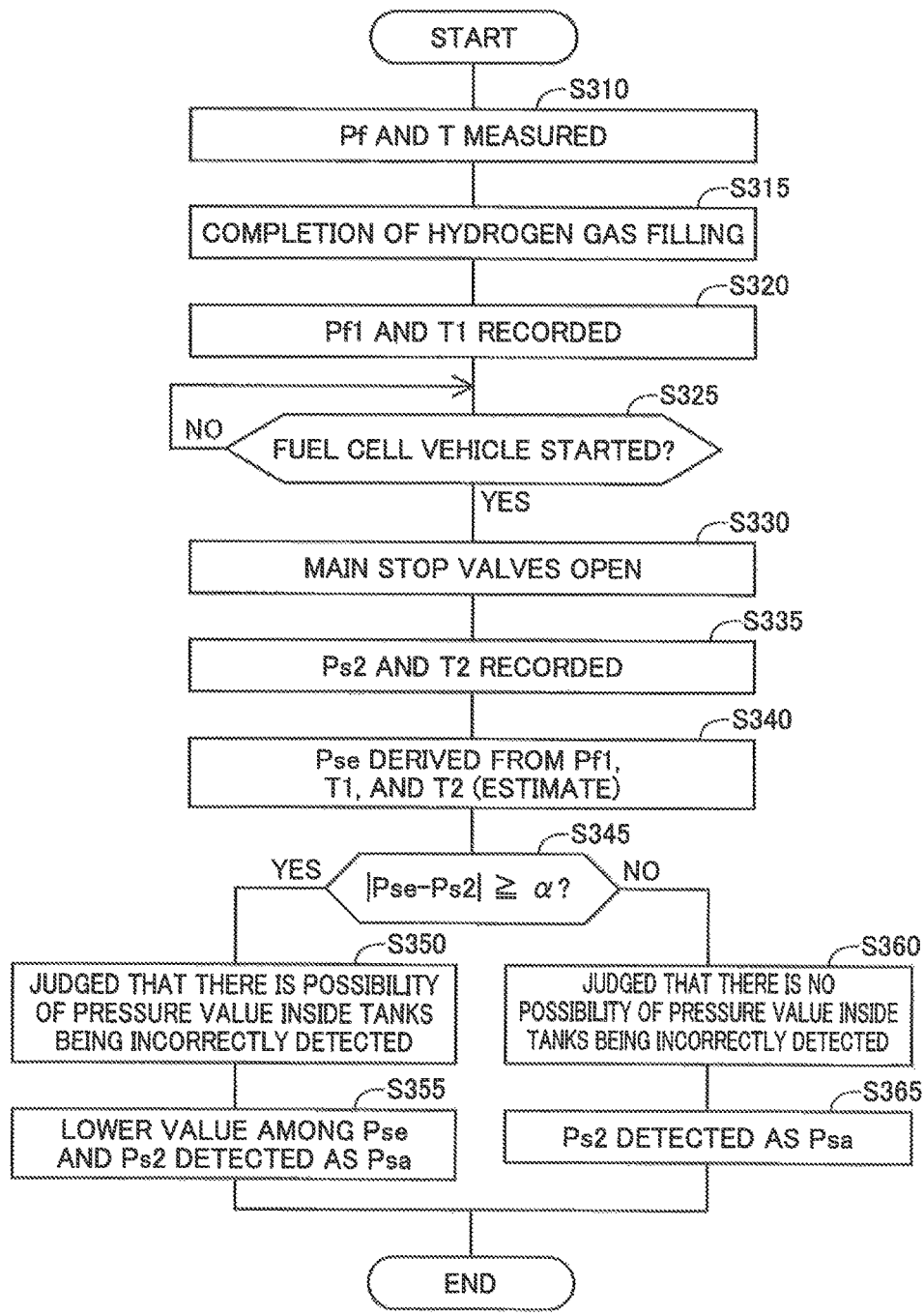
FIG. 3 A flowchart showing the steps of current pressure value detection processing.

A-3. Current Pressure Value Detection Processing:

FIG. 3 is a flowchart showing the steps of current pressure value detection processing. Current pressure value detection processing refers to processing in which the pressure value inside the gas supply system 60 at the start time of the fuel cell vehicle 500 (hereinafter referred to as "current pressure value Psa") is detected. As will be described below, there are situations in which the supply-time pressure value Ps (specifically, the pressure value measured by the supply-side pressure sensor 80) is detected as the current pressure value Psa and situations in which Ps is not detected as the current pressure value Psa.

In this embodiment of the fuel cell system 100, when filling of hydrogen gas to the tanks 20 by the hydrogen gas station 900 begins, current pressure value detection processing is carried out. During filling of hydrogen gas by the hydrogen gas station 900, when, first, a lid not illustrated is opened and the controller 90 starts, then the nozzle 910 of the hydrogen gas station 900 is engaged with the receptacle 30, infrared communication between the communication portion 920 of the hydrogen gas station 900 and the communication portion 40 of the fuel cell system 100 becomes possible as filling of hydrogen gas becomes possible. Based on the standards of the Society of Automotive Engineers (SAE), filling of hydrogen gas is performed at a boosting speed that does not exceed the temperature specifications of the tanks 20.

When filling of hydrogen gas begins, the fill-side pressure sensor 70 measures the fill-time pressure value Pf, and the temperature sensors 28 measure the temperature T (step S310). Each of the sensors 70 and 28 output their respective detected values to the controller 90. The controller 90 outputs these values to the communication portion 40, and the communication portion 40 transmits them to the communication portion 920 through infrared communication. In this way, filling of hydrogen gas is carried out while monitoring the fill-time pressure value Pf and the temperature T.

When the filling of hydrogen gas is completed (step S315), the controller 90 records the maximum pressure value Pf1 that is the maximum pressure value among the fill-time pressure values Pf, and also records the temperature T1 when the maximum pressure value Pf1 was measured (step S320). Following the filling of hydrogen gas, the lid is closed.

The controller 90 stands by until the fuel cell vehicle 500 starts (step S325). When the fuel cell vehicle 500 starts (step S325: YES), the controller 90 opens the main stop valves 26a and 26b (step S330). The starting of the fuel cell vehicle 500 includes the starting of the entire fuel cell system 100. The controller 90 records the measured pressure value Ps2 measured by the supply-side pressure sensor 80 and the temperature T2 measured by the temperature sensors 28 (step S335)

Using formula (2) above, the controller 90 derives the estimated pressure value Pse based on the maximum pressure value Pf1 and the temperature T1 recorded in the step S320, and the temperature T2 recorded in the step S335 (step S340). The controller 90 judges whether or not the absolute value (|Pse−Ps2|) of the difference between the estimated pressure value Pse derived in the step S340 and the measured pressure value Ps2 recorded in the step S335 is above a predetermined value α (step S345). The reason differences arise between the two pressure values Pse and Ps2 is as described above. In this embodiment, the predetermined value α is set at 10 MPa. However, the predetermined value α is not limited to 10 MPa and may be set to other arbitrary numerical values. Considering measurement errors in each of the pressure sensors 70 and 80 and in the temperature sensors 28, it is favorable to set the predetermined value α to a value outside the range of such measurement errors. As far as situations in which the absolute value becomes greater than the predetermined value α, situations such as the fill-side pressure sensor 70 or the supply-side pressure sensor 80 experiencing aging degradation or malfunctioning may be imagined, as described above.

When it is judged that the absolute value of the difference between the estimated pressure value Pse and the measured pressure value Ps2 is above the predetermined value α (step S345: YES), the controller 90 judges that there is a possibility of the pressure value inside the tanks 20 being incorrectly detected to be higher than the actual value (step S350). The controller 90 detects as the current pressure value Psa the lower value among the estimated pressure value Pse and the measured pressure value Ps2 (step S355). When the absolute value of the difference between the two pressure values Pse and Ps2 is above the predetermined value α, there is a possibility that the zero point of the supply-side pressure sensor 80 will fluctuate in the positive direction and the measured pressure value Ps2 will be measured to be higher than the actual value. In that situation, if the measured pressure value Ps2 is detected as the current pressure value Psa, namely the pressure value inside the tanks 20, the pressure value inside the tanks 20 is incorrectly detected to be higher than the actual value. Therefore, in that situation, the estimated pressure value Pse, which is the lower value and has a higher likelihood of showing the actual pressure value, is detected as the current pressure value Psa. Due to the zero point of the supply-side pressure sensor 80 fluctuating in the negative direction and the measured pressure value Ps2 being measured to be lower than the actual value, there are situations in which the absolute value of the difference between the two pressure values Pse and Ps2 is above the predetermined value α. In that situation, because the measured pressure value Ps2, which is lower than the estimated pressure value Pse, namely lower than the actual value, is detected as the current pressure value Psa, it is possible to avoid the pressure value inside the tanks 20 being incorrectly detected to be higher than the actual value. Due to the zero point of the fill-side pressure sensor 70 fluctuating, it is possible for the absolute value of the difference between the two pressure values Pse and Ps2 to be above the predetermined value α. However, even in that situation, the lower value among the estimated pressure value Pse and the measured pressure value Ps2 is either equivalent to the actual pressure value or lower than the actual pressure value. Hence, it is possible to avoid the pressure value in the tanks 20 from being incorrectly detected to be higher than the actual value.

Conversely, when it is judged that the absolute value of the difference between the estimated pressure value Pse and the measured pressure value Ps2 is not above the predetermined value α (step S345: NO), the controller 90 judges that there is no possibility of the pressure value inside the tanks 20 being incorrectly detected to be higher than the actual value (step S360). In that situation, the controller 90 detects the measured pressure value Ps2 as the current pressure value Psa (step S365). Through the above steps, the current pressure value detection processing is completed.

When the current pressure value detection processing is completed as described above, the controller 90 records the current pressure value Psa. Afterward, the filling factor specification portion 95 uses formula (1) above to specify the filling factor based on the current pressure value Psa, and the controller 90 detects the distance to empty of the fuel cell vehicle 500 based on the specified filling factor and notifies the user.

In this embodiment, the following items correspond to each other: the fill-time pressure value Pf to the 1st pressure value in the claims; the maximum pressure value Pf1 to the 1st pressure value that shows the maximum fill-time pressure during gas filling in the claims; the supply-time pressure value Ps to the supply piping pressure in the claims; the measured pressure value Ps2 to the 2nd pressure value in the claims; the estimated pressure value Pse to the estimated pressure value in the claims; and the current pressure value Psa to the pressure value detected as the supply piping pressure in the claims. Additionally, the temperature T1 corresponds to the internal temperature when the fill-time pressure was measured in the claims, and the temperature T2 corresponds to the internal temperature when the supply piping pressure was measured in the claims. Further, the starting of the fuel cell system 100 includes the starting of the fuel cell 10.

In the fuel cell system 100 of the embodiment described above, when the absolute value of the difference between the estimated pressure value Pse that was estimated and the measured pressure value Ps2 that was measured by the supply-side pressure sensor 80 is above the predetermined value α, the lower value among the estimated pressure value Pse and the measured pressure value Ps2 is detected as the current pressure value Psa. Therefore, even in a situation in which the measured pressure value Ps2 is detected to be higher than the actual pressure value inside the tanks 20 due to aging degradation, malfunction, and the like of the supply-side pressure sensor 80, the estimated pressure value Pse that was estimated based on the value measured by the fill-side pressure sensor 70 is detected as the current pressure value Psa, making it possible to prevent the pressure value inside the tanks 20 from being incorrectly detected to be higher than the actual value. Additionally, even in a situation in which the estimated pressure value Pse is derived to be higher than the actual pressure value inside the tanks 20 due to aging degradation, malfunction, and the like of the fill-side pressure sensor 70, the measured pressure value Ps2 that was measured by the supply-side pressure sensor 80, namely the actual pressure value inside the tanks 20, is detected as the current pressure value Psa, making it possible to prevent the pressure value inside the tanks 20 from being incorrectly detected to be higher than the actual value. In a situation in which the measured pressure value Ps2 is measured to be lower than the actual pressure value inside the tanks 20 due to aging degradation, malfunction, and the like of the supply-side pressure sensor 80, such a measured pressure value Ps2 is detected as the current pressure value Psa. Additionally, in a situation in which the estimated pressure value Pse is derived to be lower than the actual pressure value inside the tanks 20 due to aging degradation, malfunction, and the like of the fill-side pressure sensor 70, such an estimated pressure value Pse is detected as the current pressure value Psa. Accordingly, it is possible even in these situations to prevent the pressure value in the tanks 20 from being incorrectly detected to be higher than the actual value. In this way, the fuel cell system 100 of this embodiment is able to prevent the pressure value inside the tanks 20 from being incorrectly detected to be higher than the actual value, making it possible to prevent the filling factor of the hydrogen gas in the tanks 20 from being detected to be higher than the actual filling factor. For this reason, it is possible to prevent the distance to empty of the fuel cell vehicle 500 from being overestimated, and to prevent a decrease in convenience for the user.

Additionally, the estimated pressure value Pse is derived based on the maximum pressure value Pf1 detected by the fill-side pressure sensor 70 during the filling of hydrogen gas; the temperature T1; and the temperature T2 at the time when the fuel cell vehicle 500 started for the first time following the completion of hydrogen gas filling. In this way, because the estimated pressure value Pse is derived using the pressure value when the nozzle 910 and the receptacle 30 are in a state of engagement, it is possible to reduce the effect of depressurization in the gas filling system 50 in comparison to configurations that use the pressure value when the nozzle 910 and the receptacle 30 are in a state of non-engagement. Therefore, it is possible to suppress declines in the estimation accuracy of the estimated pressure value Pse and to more reliably prevent the pressure value in the tanks 20 from being incorrectly detected to be higher than the actual value. In addition, because the estimated pressure value Pse is derived using the temperature T2, it is possible to suppress declines in the estimation accuracy of the estimated pressure value Pse, even in situations in which the fuel cell vehicle 500 is left at the hydrogen gas station 900 for a long period of time due to any circumstances and the value of temperature T1 and the value of temperature T2 differ greatly.

Further, because current pressure value detection processing is carried out using the measured pressure value Ps2 that was measured at the starting time of the fuel cell system 100, it is possible to reduce the effect of a decrease in the pressure value in the tanks 20 due to hydrogen gas consumption in comparison to configurations that use the supply-time pressure value Ps that was measured after the supply of hydrogen gas began following the starting of the fuel cell system 100. Additionally, in a situation in which the absolute value of the difference between the estimated pressure value Pse and the measured pressure value Ps2 is above the predetermined value α, there is judged to be a possibility of the pressure value inside the tanks 20 being incorrectly detected to be higher than the actual value, making it possible to judge whether there is a possibility of incorrect detection while taking into account the measurement errors in each of the pressure sensors 70 and 80 and in the temperature sensors 28. Therefore, it is possible to improve the accuracy of judgements regarding whether there is a possibility of the pressure value inside the tanks 20 being incorrectly detected to be higher than the actual value. Furthermore, because the controller 90 records the detected current pressure value Psa, it is possible to analyze the cause of a malfunction in the fill-side pressure sensor 70 or the supply-side pressure sensor 80 using such a value, send a warning message or a warning sound to a user, etc. Additionally, because the controller 90 includes a filling factor specification portion 95, it is possible to specify the filling factor based on the current pressure value Psa and to use this in the detection of the distance to empty of the fuel cell vehicle 500.

B. Modifications:

B-1. Modification 1:

Although, in the above embodiment, the measured pressure value Ps2 and the temperature T2 are recorded under the presumption that at the time t2, the point in time at which the fuel cell vehicle 500 starts and the main stop valves 26a and 26b are opened, the values of the supply-side pressure sensor 80 and the temperature sensors 28 are both stable, the invention is not limited to this presumption. Prior to recording the measured pressure value Ps2 and the temperature T2, the controller 90 may judge whether or not the supply-side pressure sensor 80 and the temperature sensors 28 are stable, then, if judged to be stable, may record the measured pressure value Ps2 and the temperature T2. In such a configuration, because the measured pressure value Ps2 and the temperature T2 are recorded when each of the sensors 80 and 28 are judged to be stable, it is possible to reduced measurement errors caused by instability of the sensors 80 and 28, to suppress declines in the measurement accuracy of the measured pressure value Ps2 and the temperature T2, and to suppress declines in the estimation accuracy of the estimated pressure value Pse.

B-2. Modification 2:

Although, in the above embodiment, the controller 90 records the maximum pressure value Pf1 that is the maximum pressure value among the fill-time pressure values Pf and uses it to estimate the estimated pressure value Pse, it may record the fill-time pressure value Pf at the time hydrogen gas filling is completed and use it to estimate the estimated pressure value Pse. This configuration makes it possible to derive the estimated pressure value Pse using a simple method. Additionally, although the controller 90 opens the main stop valves 26a and 26b when the fuel cell vehicle 500 (fuel cell system 100) is started, the main stop valves 26a and 26b may be opened without starting the fuel cell system 100. In this configuration, the opening of the main stop valves 26a and 26b may be used as a trigger to record the measured pressure value Ps2 and the temperature T2. Even in such a configuration, the same advantages are achieved as in the fuel cell system 100 of the above embodiment.

B-3. Modification 3:

Although, in the above embodiment, the controller 90 judges whether or not the absolute value of the difference between the estimated pressure value Pse and the measured pressure value Ps2 is above the predetermined value α, the invention is not limited to this configuration. The controller 90 may, without making such a judgement, specify as the current pressure value Psa the lower value among the estimated pressure value Pse and the measured pressure value Ps2. Because the processes controller 90 to perform may be reduced in such a configuration, it allows the load on the controller 90 to be reduced. Additionally, the controller 90 may omit the recording of the specified current pressure value Psa and specify the filling factor. Further, the controller of the fuel cell vehicle 500 may specify the filling factor, excluding the filling factor specification portion 95. Even in this configuration, the same advantages are achieved as in the fuel cell system 100 of the above embodiment.

B-4. Modification 4:

The configuration of the fuel cell system 100 in the above embodiment is only one example, and a variety of modifications are possible. The resin liner of the tanks 20 has a risk of hardening in a low-temperature environment and being damaged. As such, minimum pressure judgement is carried out for the tanks 20 in order to prevent the temperature T and the supply-time pressure value Ps in the tanks 20 from going under the minimum value. Here, for instance, the specified current pressure value Psa may be used in minimum pressure judgement for the tanks 20. Even in a situation in which, when aging degradation, malfunction, and the like have occurred in the supply-side pressure sensor 80, the supply-time pressure value Ps of the tanks 20 is measured to be higher than the actual value while the actual pressure value in the tanks 20 is below the minimum value, it is possible that the minimum pressure judgement will not be carried out normally and that the user will not be notified. However, because, in the fuel cell system 100 of this embodiment, the lower value among the estimated pressure value Pse and the measured pressure value Ps2 is specified as the current pressure value Psa, it is possible to prevent a situation in which the user is not notified despite the actual pressure value in the tanks 20 being below the minimum value. Additionally, the specified current pressure value Psa may be used in detecting leakage of hydrogen gas. Further, when there is judged to be a possibility of the pressure value inside the tanks 20 being incorrectly detected to be higher than the actual value, the invention may notify the user of the fuel cell vehicle 500 that there is a possibility of aging degradation, malfunction, and the like of the supply-side pressure sensor 80, etc. and may encourage repairs or replacements. This further prevents decreases in convenience for the user.

B-5. Modification 5:

Although, in the above embodiment, the fuel cell system 100 is equipped and used in the fuel cell vehicle 500, as an alternative to the fuel cell vehicle 500, it may be equipped in other arbitrary moving bodies or may be used as a fixed source of power. Even in such configurations, it is possible to suppress the filling factor of the hydrogen gas in the tanks 20 from being incorrectly detected to be higher than the actual value, to prevent a situation in which an unexpected fuel deficiency occurs, and to prevent a decrease in convenience for the user.

This invention is not limited to the embodiments or modifications described above, but may be realized using a variety of configurations to the extent that a configuration does not deviate from the general purpose therein. For instance, the technical features within the embodiments and modifications regarding the technical features within the various aspects listed in the SUMMARY may be replaced or combined as needed in order to solve all or some of the abovementioned problems, or in order to achieve all or some of the abovementioned advantages. Additionally, if those technical features are not described as essential in this specification, they may be omitted as needed.

What is claimed is:

1. A fuel cell system comprising:
   a fuel cell;
   a tank that stores gas used in the fuel cell;
   a first pressure sensor that measures a fill-time pressure that is pressure during gas filling in a fill piping for filling the tank with the gas;
   a second pressure sensor that measures a supply piping pressure that is pressure on start of the fuel cell, in a supply piping for supplying the gas from the tank to the fuel cell;
   a temperature sensor that measures an internal temperature of the tank; and
   a controller programmed to, when the fuel cell starts,
      derive an estimated pressure value of the supply piping pressure based on a first pressure value that shows the fill-time pressure, the internal temperature when the first pressure value was measured, and the internal temperature when the supply piping pressure was measured, and
      detect as the supply piping pressure the lower value among the estimated pressure value and the second pressure value that shows the measured supply piping pressure.

2. The fuel cell system according to claim 1, wherein
   when the controller derives the estimated pressure value, the controller uses the first pressure value that shows the largest fill-time pressure during the gas filling.

3. The fuel cell system according to claim 1, wherein
   when an absolute value of difference between the estimated pressure value and the second pressure value is above a predetermined value, the controller detects the lower value among the estimated pressure value and the second pressure value as the supply piping pressure, and when the absolute value is below the predetermined value, detects the second pressure value as the supply piping pressure.

4. The fuel cell system according to claim 1, wherein
   the controller records a pressure value detected as the supply piping pressure.

5. The fuel cell system according to claim 1, further comprising,
   a filling factor specification portion that derives a filling factor of the gas in the tank using the pressure value detected as the supply piping pressure.

6. The fuel cell system according to claim 1 that is equipped in a fuel cell vehicle.

7. A method for controlling a fuel cell system having a fuel cell and a tank that stores gas used in the fuel cell, the method comprising:
   measuring a fill-time pressure that is pressure during gas filling in a piping for filling the tank with the gas;
   measuring the supply piping pressure that is pressure on start of the fuel cell in a supply piping for supplying the gas from the tank to the fuel cell;
   measuring an internal pressure of the tank;
   deriving the estimated pressure value of the supply piping pressure on start of the fuel cell based on a first pressure value that shows the fill-time pressure, the internal temperature when the first pressure value was measured, and the internal temperature when the supply piping pressure was measured; and
   detecting as the supply piping pressure the lower value among the estimated pressure value and a second pressure value that shows the measured supply piping pressure.

8. The method for controlling the fuel cell system according to claim 7, wherein
   in deriving the estimated pressure value of the supply piping pressure on start of the fuel cell, the first pressure value that shows the largest fill-time pressure during the gas filling, is used.

9. The method for controlling the fuel cell system according to claim 7, wherein
   detecting as the supply piping pressure the lower value among the estimated pressure value and the second pressure value includes the process in which, when an absolute value of difference between the estimated pressure value and the second pressure value is above a predetermined value, the lower value among the estimated pressure value and the second pressure value is detected as the supply piping pressure, and when the absolute value is below the predetermined value, the second pressure value is detected as the supply piping pressure.

10. The method for controlling the fuel cell system according to claim 7, further comprising,
    recording a pressure value detected as the supply piping pressure.

11. The method for controlling the fuel cell system according to claim 7, further comprising,
    deriving a filling factor of the gas in the tank using a pressure value detected as the supply piping pressure.

* * * * *